US008582426B2

(12) United States Patent
Kirrmann et al.

(10) Patent No.: US 8,582,426 B2
(45) Date of Patent: Nov. 12, 2013

(54) RECEPTION OF REDUNDANT AND NON-REDUNDANT FRAMES

(75) Inventors: Hubert Kirrmann, Daettwil (CH); Dacfey Dzung, Wettingen (CH)

(73) Assignee: ABB Research Ltd., Zürich (CH)

(*) Notice: Subject to any disclaimer, the term of this patent is extended or adjusted under 35 U.S.C. 154(b) by 1529 days.

(21) Appl. No.: 11/798,765

(22) Filed: May 16, 2007

(65) Prior Publication Data
US 2007/0223533 A1 Sep. 27, 2007

Related U.S. Application Data

(63) Continuation of application No. PCT/CH2005/000678, filed on Nov. 15, 2005.

(30) Foreign Application Priority Data

Nov. 16, 2004 (EP) .................................. 04405708

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ......................................... 370/225; 370/242

(58) Field of Classification Search
USPC ....................................................... 370/252
See application file for complete search history.

(56) References Cited

U.S. PATENT DOCUMENTS

| 5,490,252 | A | * | 2/1996 | Macera et al. | 709/249 |
| 5,535,338 | A | * | 7/1996 | Krause et al. | 709/222 |
| 6,282,669 | B1 | * | 8/2001 | Imanaka et al. | 714/4 |
| 6,327,660 | B1 | * | 12/2001 | Patel | 713/193 |
| 6,922,785 | B1 | * | 7/2005 | Brewer et al. | 713/153 |

(Continued)

FOREIGN PATENT DOCUMENTS

EP 0 854 610 A2 7/1998

OTHER PUBLICATIONS

Roy Courtney, Draft 1 of The Aircraft Data Networks, Project 664, Part 7—Deterministic Networks, May 23, 2003, Aircraft Data Networks Working Group, Aeronautical Radio, Inc., pp. 1-76.*

(Continued)

*Primary Examiner* — John Blanton
*Assistant Examiner* — Christopher Crutchfield
(74) *Attorney, Agent, or Firm* — Buchanan Ingersoll & Rooney PC (57) ABSTRACT

The present disclosure relates to highly available communication networks, e.g., for industrial or utility applications such as substation automation. The devices are connected to two redundant lines through two independent transceivers and bus controllers, i.e. the physical layer and the link layer of the corresponding protocol stack is duplicated. For seamless operation, a sender sends frames simultaneously over both lines and a receiver accepts whichever frame of a pair comes first and ignores the late frame. An exemplary method is disclosed for discarding duplicate frames at the link layer without considering the higher protocol layers, based on a counter inserted in the frame and an algorithm for rejection, with a corresponding means to detect which frames operate according to the redundancy protocol.

17 Claims, 4 Drawing Sheets

(56) References Cited

U.S. PATENT DOCUMENTS

| | | | |
|---|---|---|---|
| 7,346,052 B2 * | 3/2008 | Saint Etienne et al. | 370/389 |
| 2002/0091784 A1 * | 7/2002 | Baker et al. | 709/208 |
| 2003/0147377 A1 | 8/2003 | Saint Etienne et al. | |
| 2005/0136900 A1 * | 6/2005 | Kim et al. | 455/414.4 |

OTHER PUBLICATIONS

G. Scheer, D. Dolezilek, Comparing the Reliability of Ethernet Network Topologies in Substation Control and Monitoring Networks, As Recorded Jul. 15, 2003, pp. 1-15.*

T. Jeffree, Topics for Joint 802.1/802.3 Technical Plenary, pp. 1-31, Mar. 2004.*
Author Unknown, The ANSI/IEEE 802.11 Standard, The LAN MAN Standards Committee of the IEEE Computer Society, Jun. 12, 2003, pp. 34-39.*
Author Unknown, Merriam Webster Dictonary, Definition of "Tangible", as retrieved form www.m-w.com on Mar. 25, 2013, pp. 1-3.*
European Search Report dated Apr. 25, 2005.
International Search Report dated Mar. 15, 2006.
Written Opinion of the International Searching Authority dated Mar. 15, 2006.
International Preliminary Report on Patentability dated Feb. 9, 2007.

* cited by examiner

RECEPTION OF REDUNDANT AND NON-REDUNDANT FRAMES

RELATED APPLICATIONS

This application claims priority under 35 U.S.C. §119 to EP Application 04405708.1 filed in Europe on Nov. 16, 2004, and as a continuation application under 35 U.S.C. §120 to PCT/CH2005/000678 filed as an International Application on Nov. 15, 2005, designating the U.S., the entire contents of which are hereby incorporated by reference in their entireties.

TECHNICAL FIELD

The disclosure relates to the field of communication networks in applications such as vehicle control, drive control or substation automation. A method of receiving frames by a receiving device in a communication network is disclosed.

BACKGROUND INFORMATION

To increase the availability of data networks in vital or otherwise critical applications such as vehicle control, drive control or substation automation, redundancy is required. Basically, the latter may be provided by duplicating the communication lines, e.g. the electrical or optical transmission lines, as well as at least the physical layer of the corresponding protocol stack. While the sending of duplicate information generally does not represent a major obstacle to a straightforward implementation, receiving and handling of duplicated information may require special provisions.

The communication standard IEC 61375, for the purpose of improving availability to enable its use in rail vehicles, specifies two physically independent elementary networks and introduces a frame-by-frame redundancy, in which a sender sends redundant frames simultaneously over the two lines, and a receiver primarily receives the data over one line while observing the other. US Patent Application Publication US 2003/0147377 A1 applies this principle to redundant switched full-duplex Ethernet type communication networks. For the purpose of filtering duplicates, the sender adds an identifier field to the frames before sending identical frames on both elementary networks. A receiver accepts a frame only if its identifier has not been received previously via the other network, i.e. duplicates are rejected at the link layer. The identifier is a continuous frame number or sequence counter value of successive frames that is restarted from zero after a determined count as disclosed e.g. by the IEEE standard 802.2. A given time window delimits the time for acceptance of a frame. In order to maintain the standard Internet Protocol (IP) frame header, the sequence counter can be inserted between the payload and the check sequence.

The aforementioned method works well within a closed environment in which all devices are expected to insert a sequence counter in the frames. However, in particular in the area of substation automation, third-party devices and/or mobile devices such as engineering laptops are often connected to one of the two redundant lines only and do not have knowledge of the particular redundancy protocol used by the majority of devices in the network. In this case, the receivers are confronted both with frames that carry a sequence counter and frames that do not carry a sequence counter. In this case, the receivers might either interpret the field comprising the sequence counter and appended to the former frames as an error or ignore it as padding. While the TCP and UDP protocols are able to handle this case, other protocols could actually reject the frame. To avoid this, extensive network and device configuration procedures determining for each device if it does or not obey to the redundancy protocol would be required prior to any data communication. In addition, a general problem of Ethernet frames resides in the fact that in some cases, there is no reliable information about the frame length. Therefore, truncating a frame could result in a correct checksum in some cases, leading to an undetected error.

EP 854 610 discloses an Ethernet redundancy method without switch-over for exchanging measurement data and control commands. The method discards duplicates (i.e. redundant frames) at a low level control section of the receiving device by means of a data identifier, but does not provide for an active detection of singular frames deprived of said data identifier. In detail, singular transmission data addressed to a receiving device is stored in a reception area of a buffer section. In the subsequent step of checking if identical data has already been received over the redundant system's communication line, no such identical data is found, and the singular data is actually forwarded to the respective reception queue as well as to the upper level application. After some time, the abnormality process removes the singular data from the reception queue, as for these no duplicate will be received within a predetermined timeout period. The occurrence of singular data is treated as a scarce case of abnormal behavior, and the method inherently processes the singular data to the upper level application without even considering to identify the singular data at the low level control section of the receiving device.

SUMMARY

The disclosure can enable, with limited or no configuration effort, a sending device to be connected to one of two lines of a redundant communication network and to send frames to a receiving device connected to both lines and prepared to receive redundant frames sent over both lines.

An exemplary receiving device performs a discrimination or differentiation between non-redundant or singular frames transmitted over one line only, and duplicated or redundant frames transmitted, or at least intended to be transmitted, over both lines. Any frame identified as a singular frame, of which no duplicate exists, is directly forwarded for further processing. Any frame identified as a redundant frame, transmitted according to a certain redundancy protocol, is subsequently checked for duplicates having been received beforehand. If the latter is not the case, the redundant frame is identified as a first frame and forwarded for further processing. Otherwise, the redundant frame is identified as a second or late frame and ignored, while nevertheless some information may be derived from its reception. Thus, the receiving device is able to communicate over a communication network with sending devices that implement, as well as with sending devices that do not obey, a particular redundancy protocol.

While the aforementioned discrimination could be performed at any protocol layer of the protocol stack implemented at the receiver, identification and elimination of second frames at the data link layer advantageously saves subsequent protocol layers from executing additional tasks related to duplicate rejection. Nevertheless, as in case of doubt about their redundancy or origin frames are forwarded to a subsequent protocol layer, no frame is disregarded or dropped accidentally. The subsequent protocol layer may be a higher-level layer further inspecting forwarded doubtful frames, or may be a further, singular link layer of a redundancy or relaying device sending forwarded frames over a further, singular line or a non-redundant bus.

In an exemplary embodiment, a redundancy identifier is added to the two redundant frames as part of the redundancy protocol at the sending device. The redundancy identifier is calculated on the basis of the frame to be transmitted, and compared with a redundancy identifier calculated at the receiving device based on the received frame. This enables a high confidence level to be achieved with a comparatively short redundancy identifier of only a few bits, as compared to fixed and/or pre-determined identifiers serving the same purpose.

Several methods such as checksum or hashing can be used to identify redundant frames, but in a simple exemplary embodiment, the value of the redundancy identifier is set equal to the length of the frame. This calculation-effective exploitation of frame-specific information additionally allows the receiver to detect truncated frames with accidentally correct checksums.

In another exemplary embodiment, a redundant frame received over a first line is identified as a first frame of a pair of redundant frames with identical information by means of a frame or sequence counter value transmitted with the received frame. The value of the frame received is compared to a counter or drop window of a predefined maximum length, thus no large tables of used counter values have to be maintained. Although it might be helpful for network management to keep track of the last time when a frame was received from a device, the present method makes no use of a time window.

Advantageously, the aforementioned drop window is delimited by a sync counter value. As soon as the received frames on one of the lines lag behind the sync counter value of the other line, this is interpreted as a loss of synchronisation between the two lines or an at least temporary unavailability of the former line. Hence, a loss of several frames in sequence that can occur e.g. if a switch is reconfiguring itself by executing e.g. a spanning tree protocol, is handled as well. Albeit the algorithm may fail if the delay between the two lines becomes unpredictable, this will not harm transmission, since in case of doubt no frame is rejected and the decision to use the frame is left to the higher protocol layers.

Accordingly, an exemplary redundancy method comprises one or more of the following advantageous features. a) A support of mixed redundant and singular data traffic, which allows attaching non-critical devices to only one of the two redundant lines without having the interface of a receiving device declare the other line as faulty. b) A use of a long sequence of identifiers, which eliminates the need to create a timer and keep track of time-outs for each single identifier. c) A use of contiguous identifiers, enabling two counter values per source to be updated and out-of-sequence frames to be detected without going through tables of received identifiers. d) An extendability of the redundancy scheme to cover other requirements such as Ethernet security issues as well.

BRIEF DESCRIPTION OF THE DRAWINGS

The subject matter of the invention will be explained in more detail in the following text with reference to exemplary embodiments that are illustrated in the attached schematic drawings, in which.

The reference symbols used in the drawings, and their meanings, are listed in summary form in the list of reference symbols. In principle, identical parts are provided with the same reference symbols in the figures.

DETAILED DESCRIPTION

Figure 1:
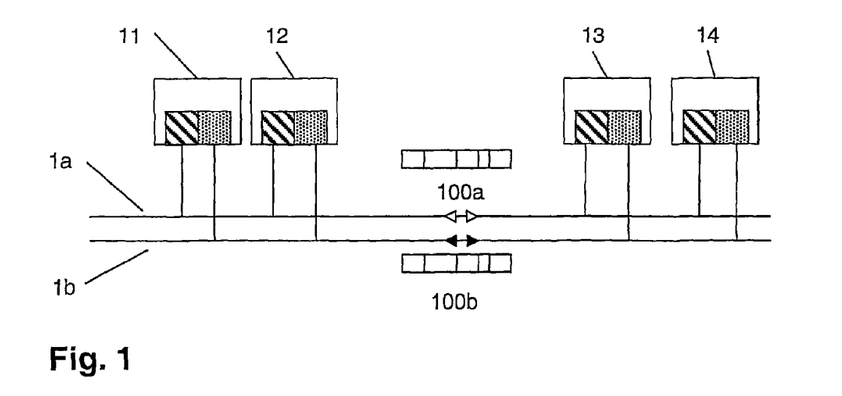
FIG. 1 shows an exemplary bus topology of a communication network.
Figure 2:
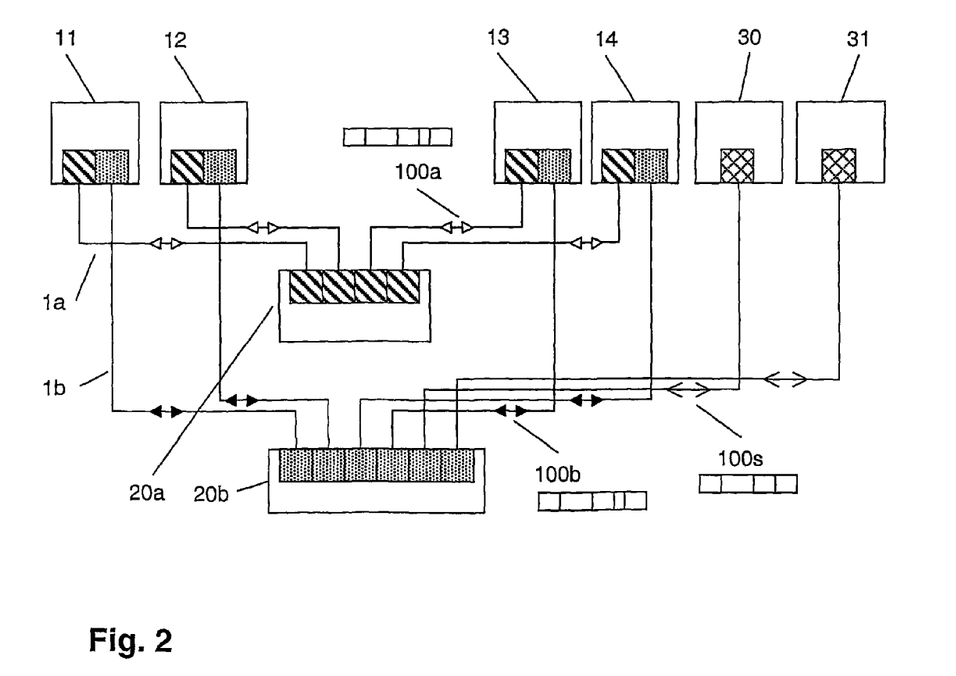
FIG. 2 shows an exemplary switch topology of a communication network.

FIG. 1 shows a bus topology representing e.g. a field-bus according to IEC 61158 and FIG. 2 shows a switch topology of a communication network representing e.g. an Ethernet-type local area network (LAN). In both cases, two or more devices 11, 12, 13, 14 are connected by two lines 1a and 1b that are completely separated from each other to avoid a common source of failure. In the present context, the term line does not only describe a point-to-point physical link, but generally refers to one of two redundant paths that can be electrical, optical or based on another technology. As will be apparent from the following detailed description, the disclosure is independent of the number of connecting elements, hubs or switches and their respective arrangement, e.g. in a loop or tree topology, and is applicable to any type of network and communication media, as well as any number of redundant lines and even only partially, i.e. section-wise, redundant lines.

A sending device or source subscriber equipment 11, 12 sends the same information 100a, 100b over both lines 1a, 1b, and a receiving device or destination subscriber equipment 13, 14 takes the information from whichever line comes first, ignoring the information from the late line but nevertheless registering its reception. If only one line is disturbed, the information will arrive over the other line. This method offers a completely seamless switchover, since there is no need to repeat a piece of information over a previously silent back-up line in case of disruption. It also offers a complete supervision of both redundant lines with normal traffic, ensuring a high coverage and avoiding a dedicated traffic for supervising a back-up line. In FIG. 2, devices 30, 31 do not participate in the redundancy protocol and send singular, i.e. non-duplicated information 100s to only one switch 20b.

Figure 3:
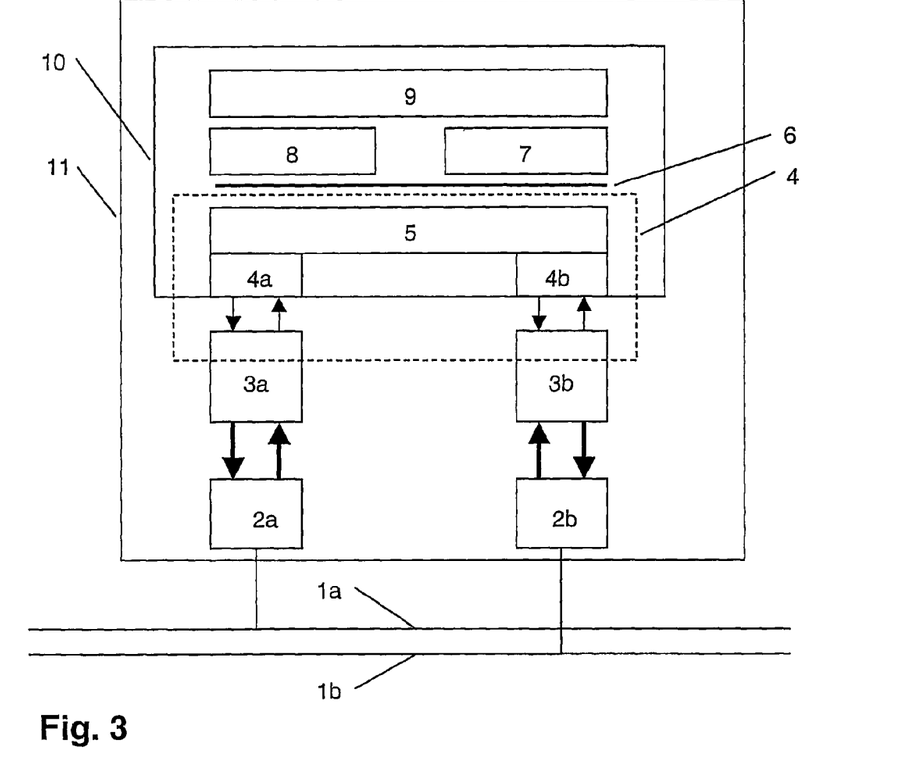
FIG. 3 depicts the components and function blocks of an exemplary device.

FIG. 3 shows the components and function blocks of a device for sending or receiving redundant frames according to an exemplary embodiment. In terms of protocol layer hierarchy, this method basically requires the physical layer and the link layer 4 to be duplicated. Accordingly, the sending device 11 comprises two line transceivers 2a and 2b, and two Ethernet controllers 3a and 3b. Processor 10 of the sending device 11 is responsible for providing data packets and preparing a pair of duplicated frames 100a, 100b there from. The frames to be sent are handed through the two Ethernet controllers 3a, 3b to the transceivers 2a, 2b, which in turn do send the frames over the redundant lines 1a, 1b.

At a receiving device 12, 13, the two frames 100a, 100b of a pair are normally almost simultaneously received. Any difference between the arrival times of the two frames may be due to the independent arbitration procedures for accessing the individual lines 1a, 1b, or due to individual delays in the switches 20a, 20b or in other connecting elements not shown in FIG. 2. In any case, it can be expected that the order or sequence of the frames sent by one device 11 over one line 1a is maintained, however a later frame 101a sent over one line 1a may be received prior to the reception of a frame 100b that was sent over the other line 1b before said later frame 101a.

The transceivers 2a and 2b are part of the lowest protocol layer of the information transfer process, i.e. the communication, modem or physical layer where the modulation of the digital data occurs. The two Ethernet controllers 3a, 3b establish the connection to the communication media and receive and send the frames from and to corresponding Ethernet controllers in other network devices. They provide the functional and procedural means to transfer data between network devices and to detect and possibly correct errors that may occur in the physical layer. A processor 10 executes, among other tasks, the two link layer protocols or drivers 4a, 4b that are part of the data link layer. The data link layer is hierarchically situated above the physical layer and handles the data exclusively in digital or binary form. A prominent example is Ethernet for local area networks (LAN). Ethernet is a packet-based computer networking technology that defines wiring and signalling for the physical layer, and packet formats and protocols for the media access control (MAC) sub-layer of the data link layer. The data link protocol generally executed in the driver 4a, 4b is often implemented as the IEEE standard 802.2 prescribes, but the Internet Protocol uses a transparent data link protocol.

In known non-redundant data transmission, the link layer 4 of the protocol stack is directly connected to a network layer 7 through a link-to-network layer interface 6. The network layer addresses messages and translates logical addresses and names into physical addresses. The network layer also determines the route from the source to the destination device and manages traffic problems, such as switching, routing and controlling the segmentation of data packets. The Internet Protocol (IP) is a widespread network protocol that sends data as blocks referred to as packets or datagrams comprising a header and a data or payload area. Above the network layer, a transport layer not depicted in FIG. 3 is situated, which in turn operates e.g. according to the transmission control protocol (TCP) or user datagram protocol (UDP). On top of the transport layer resides an application layer 9.

In principle, the two link layer protocols 4a, 4b could just send both redundant frames to the network layer 7 and frame duplication could be handled by the higher layer protocols in the processors 10. For instance, a transport protocol such as TCP is designed to reject duplicates that can appear in every network due to routing. Other protocols such as UDP or ARP do not detect duplicates, but assume that the application 9 is not affected by reception of duplicates. The latter is true when the network carries sampled values in industrial applications such as IEC 61850, as a reception of duplicate sampled measurement values does not harm the accuracy of the original measurement. The Generic Object Oriented Substation Event (GOOSE) is specified by the substation automation standard IEC 61850 and involves a reduced protocol stack 8 allowing an application 9 to access the link layer of the Ethernet protocol directly, i.e. bypassing the usual network and transport layers. This is most beneficial to the fast communication between devices on the same "subnet", i.e. without relaying at routers or gateways. By way of example, signals for interlocking or data indicative of a status of the substation and sampled at short intervals of e.g. 4 ms, are generally transmitted this way.

However, filtering of duplicates at the link layer 4 instead of handling the redundant frames in the transport layer reduces the computational load of the processor. Furthermore, and in particular in the context of substation automation and the use of the IEC 61850 standard, it is expected that a number of devices obeying to this standard will be connected to a communication network for substation automation without a priori obeying to a common redundancy protocol. Again, eliminating duplicates at the link layer 4 avoids to subject the higher layer protocols 7,8 of these devices to a double traffic.

According to exemplary embodiments, one or more additional layers are introduced in the protocol stack. In particular, a merge layer 5 formally part of the link layer 4 and hierarchically atop of the two independent link layer drivers 4a, 4b executes the redundancy protocol, and presents towards the high layer protocols 7 or 8 the same link-to-network layer interface 6 as in the non-redundant case. Thus, as long as the rejection protocol works properly, the application layer 9 and the high layer protocols 7 or 8 do not notice the presence or absence of redundancy at all. The merge layer 5 itself behaves as a network layer for the link layer drivers 4a and 4b, and keeps track of the health status of two redundant lines 1a, 1b and therefore can signal disturbances to network management, especially the out-of-sync and stale situations occurring on one of the two lines that otherwise would remain undetected. The main task of the merge layer 5 consists in distinguishing frames that participate in the redundancy protocol from non-redundant or singular frames, e.g. by inspecting a redundancy trailer 200 as detailed below.

Figure 4:
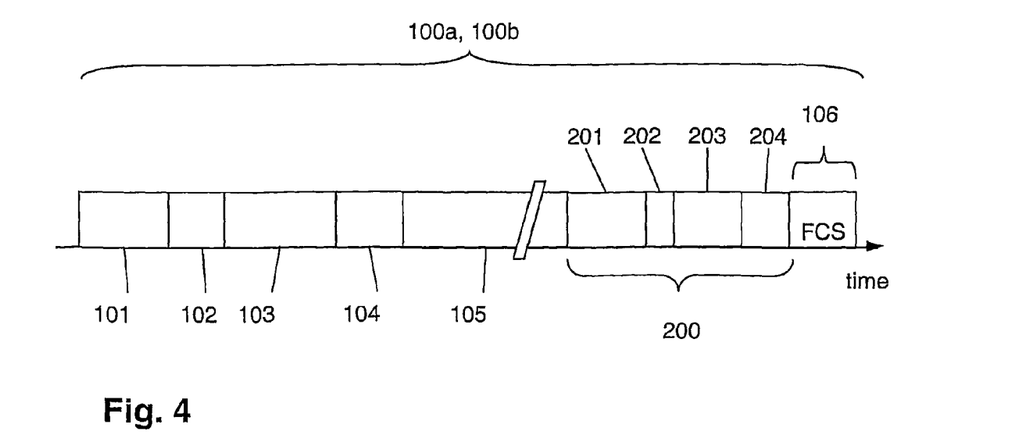
FIG. 4 illustrates an exemplary redundant frame.

FIG. 4 shows a typical frame used in the Internet over Ethernet protocol, as could be sent over either line 1a or 1b. The frame starts with a preamble 101, followed by the destination MAC address 102 that identifies the destination, followed by the source MAC address 103 that identifies the sender within the same subnet. The next field 104 is the link layer control, which obeys for instance to the 802.2, 802.1q or another link layer protocol to control data traffic between devices sharing the same medium access. Then comes the payload 105, for instance an Internet packet consisting of an IP header, a TCP header and useful data, or a GOOSE packet in IEC 61850. A frame check sequence FCS 106, e.g. a cyclic redundancy check CRC, computed by the bus controller 3a, 3b concludes the frame.

To the attention of the redundancy protocol, up to four fields of a predetermined bit-length each are inserted as a redundancy trailer 200 between the payload 105 and the frame check sequence 106. The latter comprises a sequence counter 201, a line identifier 202 that indicates over which line the frame has been sent or received, a length field 203 which acts as a redundancy identifier and gives the length of the frame over which the FCS 106 is computed, e.g. from field 101 to field 204 inclusive, and an optional identifier field 204. Obviously, the order of the aforementioned fields in the redundancy trailer 200 is not constrained.

The length field 203 duplicates the information in the link layer header 104 when the latter obeys to the IEEE 802.2 protocols, e.g. for bridge-to-bridge communication. However, Internet frames replace the length field with a protocol type, a potential integrity breach that is overcome by this solution.

The line identifier 202 serves network management purposes and allows to check that the network is correctly configured, in which case it should not be possible that a frame of line 1a appears on line 1b. In some situations, for instance during commissioning or in networks with reduced redundancy, the two redundant frames of a pair might be received over the same line, in which case the receiver segregates the lines by the line identifier field 202, applying the same protocol as if the redundant frames had been received over separate lines. At the same time the receiver signals a configuration error, since this situation bears the danger of a single point of failure. Under normal operation, line identifier 202 may be used as part of the redundancy identifier, e.g. by assigning to it the hexadecimal coding of "A" or "B".

To distinguish frames 100a, 100b sent according to the redundancy protocol from non-redundant or singular frames 100s, a receiver checks if the field of predetermined length located at position 203 has a redundancy identifier that matches the redundancy identifier computed by the controller of the receiver. In other words, if the content of field 203 does not equal the length of the received frame calculated at the receiver, the receiver assumes that this frame does not participate in the redundancy protocol and forwards it to the subsequent layers. To the same purpose, the field 202 may be checked to verify if it contains a correct line identifier, and/or the optional identifier field 204 may be evaluated as detailed further below.

If one or more of the aforementioned fields 202, 203, 204 indicates a redundant frame, this frame is further inspected by evaluating the sequence number in the field located at position 201. The sequence or frame counter 201 of the latest frame serves the purpose of duplicate rejection as described below. In principle, all operations are executed on Modulo-N arithmetic, N being the largest value of the counter plus one, wherein the counter is expected to have 16 bits. Accordingly, while implementing the following algorithm and referring to differences in counter values, particular care has to be taken.

As mentioned above, each sender keeps a send counter initialised at an arbitrary or random value, inserts the same send counter value into both frames of a pair, at the same time it sets the line identifier 202 and calculates the length field 203. The send counter value is increased for each frame pair the sending device transmits in sequence.

Figure 5:
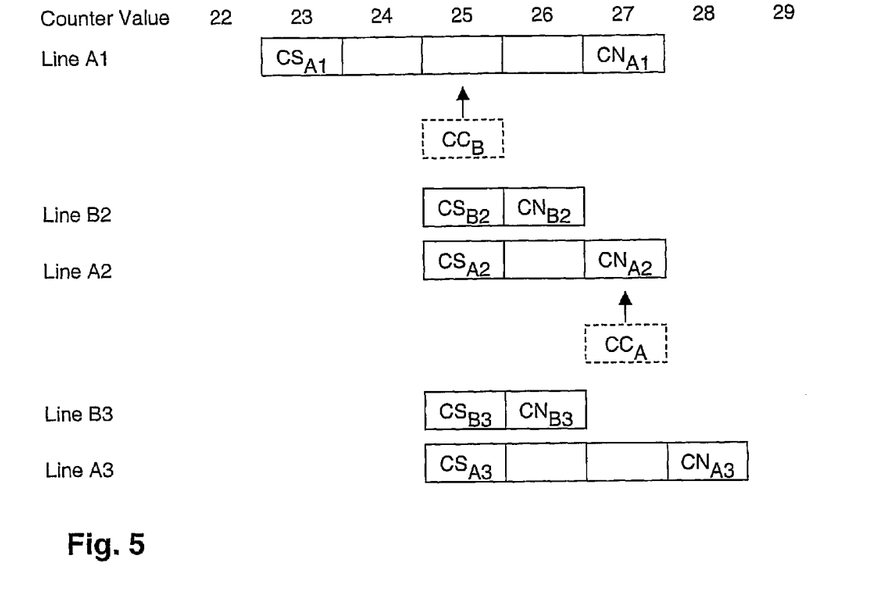
FIG. 5 shows an exemplary evolution of two drop windows.

As depicted in FIG. 5, a receiver maintains, for each sender identified by its MAC address and possibly link layer service access point (LSAP), and for both lines, a drop window of $L_W$ successive counter values, wherein the window length $L_W$ is an integer comprised between one and a maximum window length $L_{WMax}$. The drop window is delimited by a sync counter CS and the next expected sequence number CN not yet received. By definition, the latter is not part of the drop window, such that $CN-CS=L_W$.

After initialisation, the receiver accepts the counter value of the first frame it receives from a sender as the sync counter CS of that line. Referring to FIG. 5, a frame with a counter value of 23 was the first to be received over line a, followed by four more frames over the same line a. The resulting drop window of length $L_W=4$ is delimited by the sync counter CS=23 and the next expected sequence number CN=27 as depicted on the topmost row indicated "Line A1".

Now, assuming that the receiver receives a frame over line b with a current counter value $CC_B$ of 25, the receiver verifies that the current counter $CC_B$ has the expected value, otherwise an out-of-sequence error will be generated, and compares the current counter $CC_B$ with the drop window of the other line a. As the counter $CC_B$ is within the drop window of the other line, this frame is ignored as it has already been received over line a. The next expected sequence number for line b is incremented to $CN_{B2}=CC_B+1$. The drop window of line b is reduced to its minimum length by setting the new sync counter $CS_{B2}$ to $CC_B$, and the drop window of line a is shortened correspondingly by setting the sync counter $CS_{A2}$ to $CC_B$ as well, assuming that sequence number will not run backwards and referring to rows "Line A2" and "Line B2".

Next, assuming that the receiver receives, over line a, the next expected frame with a current counter value $CC_A$ of 27. As this value $CC_A$ is outside of the current window for line b, the frame is accepted and passed to the higher levels. The window size $L_{WA}$ is increased from 2 to 3 as the next expected value $CN_{A3}$ is incremented by one and the sync count $CS_{A3}$ is left unchanged, whereas the drop window of line b remains at minimum length as depicted in rows "Line A3" and "Line B3". If a number of frames is received successively over line a, the aforementioned procedure is repeated several times, and the window size $L_{WA}$ is increased up to a maximum $L_{WMax}$. As soon as this maximum is reached, the sync count $CS_A$ is incremented as well, which in turn may make the next expected value $CN_B$ of line b to fall outside of the window of line a. In this case an error counter is incremented that signals that the line b is stalled, and that the lines are out of sync. This out-of-sync state may last until the line b lagging behind has caught up by sending a frame with a sequence number within the drop window of line a.

The optional identifier field 204 may carry additional information, such as a frame checksum computed according to an algorithm agreed upon between sender and receiver, and may serve as an additional identifier for rejecting or further processing of received frames. In particular, repetition of the checksum of the frame as computed by the Ethernet protocol can be used as an additional redundancy identifier. Likewise, the checksum of a frame may be stored at the receiver together with the corresponding counter value, and reject a duplicate frame only when both the counter value and the checksum of the later frame match with a prior redundant frame. The presence or absence of the optional identifier field 204 may be indicated by a bit pattern in field 202.

Figure 6:
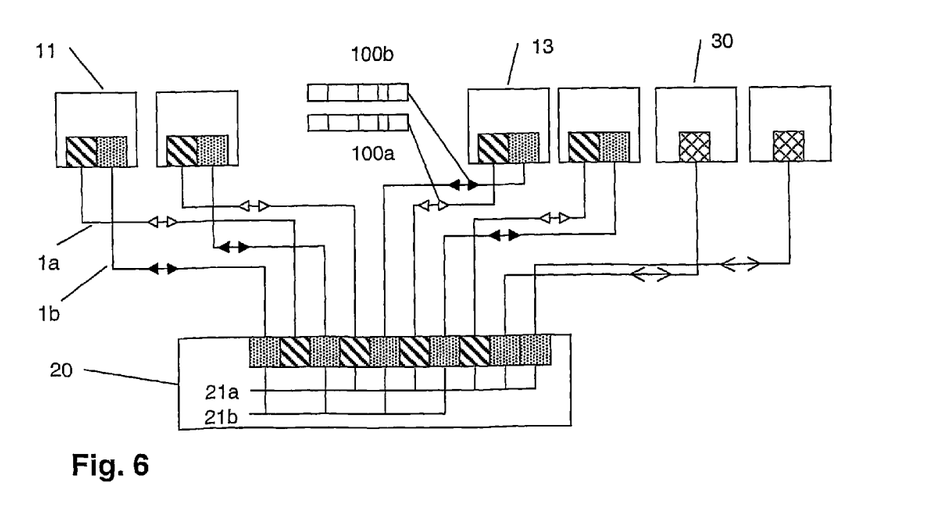
FIG. 6 depicts an exemplary virtually redundant network that shares some physical elements.

In FIGS. 1 and 2 the lines have been depicted as completely separated. In some cases however, and especially during installation, some physical elements of a point-to-point physical link between sender 11 and receiver 13 are shared between the two lines, thus avoiding the need for a complete duplication of the links. For instance, FIG. 6 depicts a configuration where the reliability of switch 20 is considered high enough to permit its use in both lines 1a, 1b. Thus, two so-called virtual local area networks 21a, 21b are created instead of two separate physical LANs as in FIG. 2. In order to enable the switch 20 to cope with this situation, distinct MAC addresses can be used for the two lines 1a, 1b ending at one and the same device 11, necessitating the Address Resolution Protocol (ARP) to be run independently on both networks.

Figure 7:
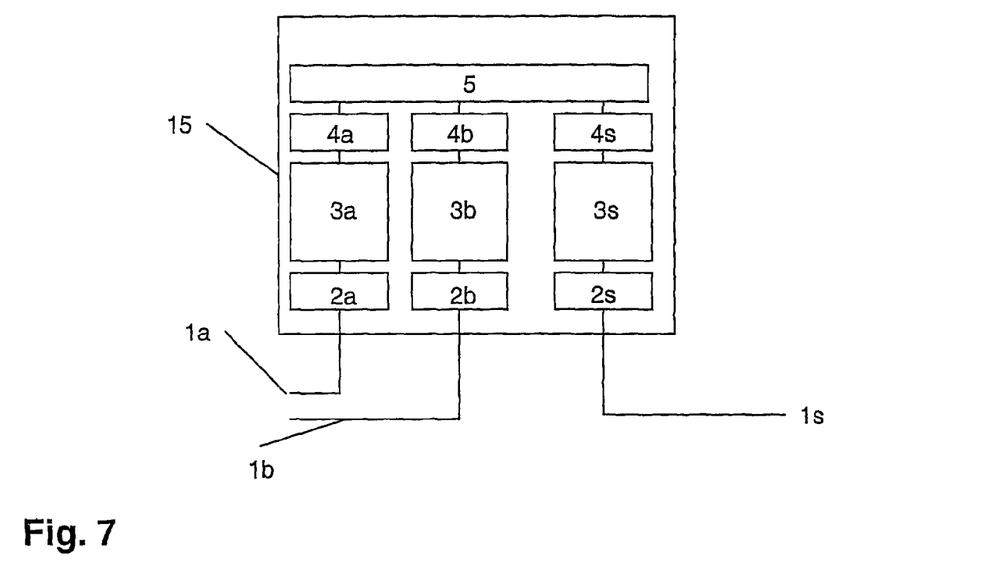
FIG. 7 shows an exemplary redundancy box.
Figure 8:
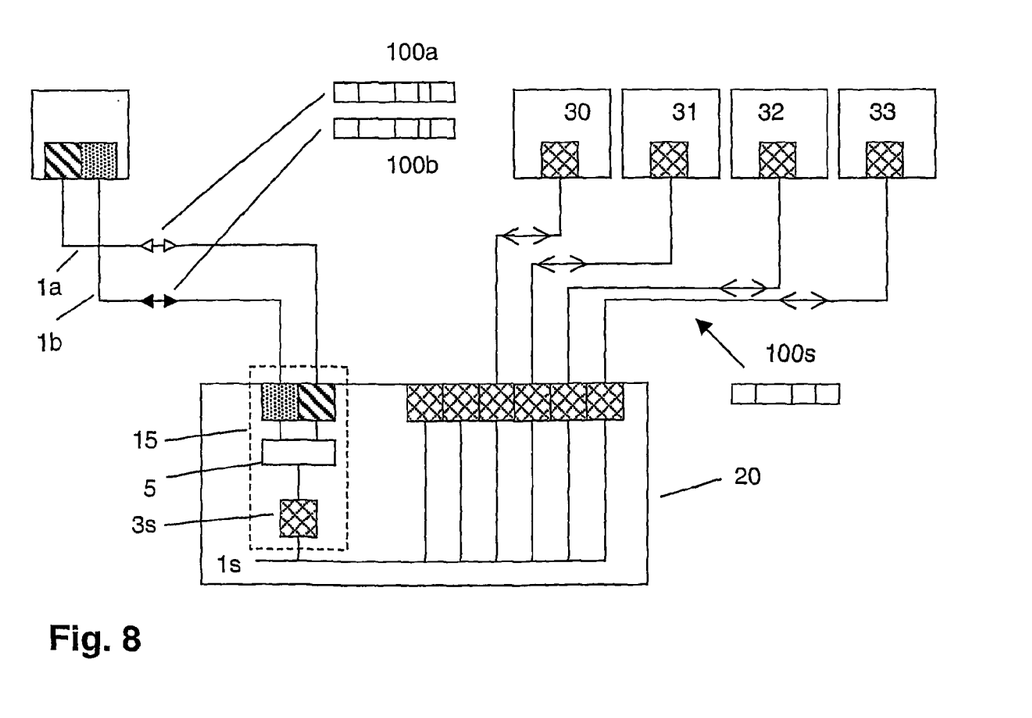
FIG. 8 illustrates an exemplary redundancy switch in another virtually redundant network.

FIG. 7 in turn shows a separate redundancy box 15 that comprises all the elements necessary for relaying frames between lines 1a, 1b and line is, i.e. the duplicate transceivers 2a, 2b, controllers 3a, 3b, link layer protocols 4a, 4b, as well as the merge layer protocol 5. The latter is connected to a third singular link layer protocols 4s and controller 3s and a corresponding singular line 1s. The merge layer 5 is responsible for generating redundant frames 100a, 100b for those singular frames received by controller 3s, and for eliminating late redundant frames received by one of the controllers 3a, 3b as described above. Obviously, the functionality of the redundancy box 15 may be incorporated into a redundancy switch 20 as depicted in FIG. 8, where basically non-redundant devices 30, 31 are connected to device 11 via two redundant lines 1a, 1b.

The frame or protocol data unit (PDU) according to FIG. 4 can advantageously be utilized for the introduction of authentication and encryption to Ethernet in a backward compatible manner as detailed below. Up to now, security protocols have been introduced on the network- (IP-), transport- (TCP-) and higher communication layers, by adding appropriate standardized header fields in their respective PDUs, i.e. the transmitted packet. These fields indicate to the receiving node how to perform message authentication and decryption on the PDU. This presumes that destination nodes are capable of reading those additional security-relevant fields and processing the PDU accordingly. On the Ethernet (link) layer, no security protocol has been standardized to-date. Such Ethernet layer security is however required (i) for protection against link layer spoofing (spoofed link layer source address), and (ii) for protection where no higher layer security protocols are available. The latter occurs e.g. in Industrial Ethernets, in particular in the area of substation automation, when the TCP/IP-layers are bypassed for faster transmission within a local area network as specified e.g. by the GOOSE protocol mentioned above. In this case, it is no longer possible to rely on IP- or TCP-layer security protocols for the protection of such "Ethernet-only" PDUs against eavesdropping or tampering.

A straightforward way to introduce additional protocols such as security protocols is by defining appropriate fields in the link layer control (LLC) part 104 of the Ethernet packet header that provide for the necessary trigger: Nodes which are able to recognize these values then know how to interpret further header fields pertaining to the encryption and/or authentication and can process the PDU accordingly. This solution requires that there is a standard specifying those fields. Apart from the Ether type assignments above, no further Ethernet security protocol standard has however been established to-date. But even with such a standard, this solution requires that all nodes in the network can be able to recognize these fields. If a source transmits an Ethernet packet by unicast or multicast carrying security protocol fields, "incompatible" receiving nodes that cannot recognize those fields will not be able to correctly read the rest of the packet. Due to the lack of implementation of standardized Ethernet security protocols in today's Ethernet network interface cards, such a backward compatibility problem becomes often an insurmountable hurdle for the introduction of Ethernet security.

In order to introduce Ethernet security in a manner compatible with Ethernet receiving nodes that are not participating in the security scheme, a similar method as introduced above for the introduction of redundancy information can be used. In analogy to the redundancy identifier that is part of the redundancy trailer 200 appended at the end of the PDU as depicted in FIG. 4, a security identifier, e.g., in the form of a frame length field, is introduced. To distinguish PDUs according to the security protocol from others, a receiver checks that the value located at the position of the length field 203 is identical to the physical packet length as determined by the controller of the Ethernet receiver. If this is not the case, the receiver assumes that this frame does not participate in the security protocol and forwards it to the upper layers without further processing. If the values agree, the receiver decodes the remaining fields of the redundancy trailer according to the format defined by the Ethernet security protocol and acts accordingly. By way of example, the security fields of interest can be taken from the definition of the known IPSec headers, specifically the encapsulating security payload (ESP) header. Accordingly, said trailer fields comprise (i) a security parameter index pointing to the relevant entry in the security policy database (indicating the encryption and/or authentication algorithm types and keys), (ii) a sequence number for replay protection, (iii) a message authentication code (MAC). The latter may cover the complete PDU for the verification of packet integrity and packet source.

Nodes not understanding the Ethernet security protocol are able to read a non-encrypted packet, albeit without being able to verify integrity and authenticity. Reception without message authentication or without encryption may be sufficient for non-critical receivers, e.g. of multicast packets. Encryption, if enabled in transport mode, can however exclude certain Ethernet addressing fields, in order to allow Ethernet switches to perform address-based switching even if they do not participate in the Ethernet security protocol.

Ethernet receivers not participating in the security protocol will simply not read the appended fields, but are still able to read the PDU correctly and to process the frame check sequence (FCS) for error detection. Thus, this scheme allows the compatible introduction of new Ethernet security protocols. If both a security protocol and a redundancy scheme are employed in the network, a combined redundancy and/or security identifier may be used to indicate this fact, complemented by additional flags signaling the presence of either one or both in the PDU.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of Designations

1a, 1b, 1s lines
2a, 2b, 2s line transceivers
3a, 3b, 3s Ethernet controllers
4a, 4b, 4s link layer protocols/drivers
4 link layer
5 merge layer
6 interface
7 network and upper layers
8 GOOSE protocol stack
9 application
10 processor
11, 12 sending devices
13, 14 receiving devices
15 redundancy box
20, 20a, 20b switches
21a, 21b virtual LANs
30, 31 singular/non redundant devices
100a, 100b redundant frames
100s singular frame
101 preamble
102 destination MAC address
103 source MAC address
104 link layer control
105 payload, higher protocol data
106 frame check sequence FCS
200 redundancy trailer
201 sequence or frame counter
202 line identifier
203 redundancy identifier, frame length field
204 optional identifier field

What is claimed is:

1. A method of receiving frames by a receiving device in a communication network, wherein the receiving device has a first network controller and a second network controller connected respectively to a first line and a second line for receiving frames sent by a sending device over the network, the method comprising:
  a) determining if a frame received over the first line is a second frame of a pair of two redundant frames each respectively transmitted over one of two lines; and
  b) forwarding the frame to a subsequent layer of the protocol stack of the receiving device for further processing unless the frame is a second frame, wherein the method further comprises, prior to step a), calculating by the receiving device, a redundancy identifier for a received frame, determining that the received frame is a redundant frame of a pair of two redundant frames each respectively transmitted over one of two lines if the calculated redundancy identifier is equal to a content of a field of predetermined length located at a redundancy identifier position of the received frame, and otherwise determining that the received frame is a singular frame transmitted over the first line only, and forwarding the singular frame to a subsequent layer of the protocol stack of the receiving device for further processing.

2. The method according to claim 1, wherein
the step of determining if the received frame is a singular frame or a redundant frame is executed at a merge layer of the protocol stack of the receiving device,
wherein the merge layer receives frames from two link layer drivers connected to the network controllers.

3. The method according to claim 2, wherein the merge layer presents a singular link-to-network layer interface towards a higher-level protocol layer.

4. The method according to claim 2, wherein the merge layer forwards the identified singular via a singular controller to a singular line or to a non-redundant bus.

5. The method according to claim 1, wherein the redundancy identifier is a frame length, a hash, or a checksum of the frame.

6. The method according to claim 1, comprising determining a first frame of a pair of redundant frames sent by the sending device by comparing a counter value transmitted with a redundant frame received over a first line and a drop window maintained at the receiving device for the second line to the sending device.

7. The method according to claim 6, wherein a drop window, maintained at the receiving device for both lines and every sending device, is delimited by a sync counter and has a maximum size $L_{WMax}$.

8. The method according to claim 1, wherein the two network controllers are Ethernet controllers, and wherein the communication network serves the purpose of substation automation.

9. A non-transitory computer-readable recording medium having a computer program tangibly recorded thereon for causing a receiving device to receive frames in a communication network, the computer program being loadable in and executable on a data processing unit, and the computer program causing the data processing unit, when executed by the data processing unit, to carry out the method according to claim 1.

10. The method according to claim 1, wherein the frame has a data format comprising at least one of a redundancy identifier and a security identifier calculated on the basis of the frame and provided for being evaluated at a first layer of the protocol stack of the sending device in the communication network processing the frame.

11. The method according to claim 10, wherein a redundancy trailer comprises the redundancy identifier, a line identifier and a sequence or frame counter, and wherein the redundancy identifier, the line identifier and the frame counter are inserted between payload and frame check sequence (FCS) of a redundant frame.

12. The method according to claim 10, wherein a security trailer comprises the security identifier, a security parameter index, a sequence number and a message authentication code, and wherein the security identifier, the security parameter index, the sequence number and the message authentication code are inserted between payload and frame check sequence (FCS) of a secured frame.

13. The method according to claim 10, wherein at least one of a redundancy trailer and a security trailer comprises a flag signalling the presence of at least one of a redundancy protocol and a security protocol in the data frame.

14. The method according to claim 7, wherein the two network controllers are Ethernet controllers, and wherein the communication network serves the purpose of substation automation.

15. A non-transitory computer-readable recording medium having a computer program tangibly recorded thereon for causing a receiving device to receive frames in a communication network, the computer program being loadable in and executable on a data processing unit, and the computer program, when executed by the data processing unit, causing the data processing unit to carry out the method according to claim 8.

16. A receiving device in a communication network for receiving frames sent by a sending device over the network, comprising:
a first network controller connected to a first line for receiving frames sent by the sending device over the network to process the frames and
a second network controller connected to a second line for receiving frames sent by the sending device over the network, wherein the receiving device comprises a controller configured to calculate a redundancy identifier for a received frame, to determine that the received frame is a redundant frame of a pair of two redundant frames each respectively transmitted over one of two lines if the calculated redundancy identifier is equal to content of a field of predetermined length located at a redundancy identifier position of the received frame, and to otherwise determine that the received frame is a singular frame transmitted over the first line only and to forward the singular frame to a subsequent layer of the protocol stack of the receiving device for further processing.

17. The receiving device according to claim 16, wherein the controller is configured to determine if the received frame is a singular frame or a redundant frame at a merge layer of the protocol stack of the receiving device, and wherein the merge layer receives frames from two link layer drivers connected to the network controllers.

\* \* \* \* \*